:::::: 
United States Patent Office 3,436,305
Patented Apr. 1, 1969

3,436,305
STARCH POLYETHYLENIMINOTHIOURETHANE ADDITIVES FOR PAPER
George C. Maher, Dunlap, Ill., assignor to the United States of America as represented by the Secretary of Agriculture
No Drawing. Filed May 5, 1966, Ser. No. 547,720
Int. Cl. D21h *3/48;* C08b *19/04*
U.S. Cl. 162—175               3 Claims

---

ABSTRACT OF THE DISCLOSURE

Paper exhibiting markedly improved strength properties is produced by adding to a cellulosic pulp 2.5–10 percent based on the dry pulp weight of a starch thiourethane, produced by reacting lowly substituted starch xanthate with about 3.5 stoichiometric equivalents of 100,000 molecular weight polyethylenimine, and then adjusting the pH with acid to precipitate the starch thiourethane upon the cellulosic fibers.

---

A nonexclusive, irrevocable, royalty-free license in the invention herein described, throughout the world for all purposes of the United States Government, with the power to grant sublicenses for such purposes, is hereby granted to the Government of the United States of America.

This invention relates to novel polyethyleniminothiourethane derivatives of starch xanthates whose incorporation into papermakers cellulosic pulps or furnishes has been found to significantly improve each of the primary strength parameters, i.e., wet strength, dry strength, burst, and fold endurance rather than only one or two of the said parameters, in contrast to the limited benefits provided by most prior art additives which ordinarily improve one or two of these parameters but at the expense of significantly weakening at least one of the other parameters.

More specifically, this invention relates to novel starch polyethyleniminothiourethanes, which for convenience I will also call simply starch thiourethanes, that are formed in an alkaline medium by reaction of xanthated starch having a sodium xanthate D.S. of at least 0.12 and preferably a maximum of about 0.34 with a sufficient quantity of high molecular weight polyethylenimine to provide a two and one-half fold excess of ethylenimino groups over the stoichiometry of one ethylenimine group per xanthate group in the starting starch xanthate, whereby the thereby formed starch thiourethane product, which precipitates upon an almost neutral adjustment of the strongly alkaline pH, is characterized by the presence of 1.75 ethylenimino groups per thiourethane functional group and a thiourethane D.S. of about 0.12–0.34 per starch AGU.

The tremendously important paper industry, which in the United States last year involved a per capita consumption of about 480 pounds of papermakers' pulp, has stimulated the discovery of a large array of additives for improving one or more strength properties of paper. Some of the additives are classical type synthetic resins, but their relatively high cost and generally mediocre substantivities, excepting in the case of some of the cationic resins, limit their employment. Dialdehyde starch was perhaps the first starch derivative to be tried as a wet strength agent for paper, but its failure to gain significant commercial acceptance may be attributed mainly to relatively poor substantivity resulting in excessive losses in the white water and of lowered fold endurance and burst strength in the resulting wet strength paper.

Cellulosic pulps which are fortified with small to very large additions of starch xanthates that are then oxidatively crosslinked in situ to the corresponding xanthide are disclosed in U.S. Patent No. 3,160,552, but again much of the starch xanthide is lost in the white water, and the xanthided pulps provide relatively little improvement in dry strength and fold endurance of the resulting paper.

Certain cellulose thiourethanes are disclosed in U.S. Patent No. 2,910,466 to Watt, but they, like viscose, have utility only for the formation of filaments and shaped objects or as ion exchangers and are inoperative as strengthening agents for addition to papermakers cellulosic pulps.

One object of the present invention is the preparation of highly versatile starch thiourethanes the addition of which to cellulosic pulps simultaneously improves the wet strength, dry strength, burst strength, and fold endurance, the resistance to tear expectedly being lowered. Another object is the formation of a starch based derivative that is essentially completely substantive to paper furnishes when stirred therewith at addition levels at least as high as 10 percent based on the dry weight of cellulosic fibers.

Other objects and advantages will appear hereinafter or will be apparent to those skilled in the art.

In accordance with the general objects of the invention, I have now discovered that the relatively lowly crosslinked starch polyethyleniminothiourethanes having a thiourethane D.S. of 0.12 to not over about 0.35 formed by reaction of xanthated starch having a xanthate D.S. of about 0.12 to not over about 0.35 with about three and one-half stoichiometric equivalents of a polyethylenimine having a molecular weight of on the order of 100,000 uniquely confer greatly increased wet strength, dry strength, burst strength, and fold endurance values to papers fortified therewith, the unobvious criticality of my invention being due in part to the unexpected finding that the said lowly substituted starch thiourethanes, i.e., those having a thiourethane D.S. of about 0.12 to 0.34 are highly effective whereas a more highly substituted species of the same copolymer, e.g., one having a thiourethane D.S. of about 0.5, provides such slight strength improvements as to not really justify commercial adoption.

The following examples and data are intended to more clearly illustrate my invention.

EXAMPLE 1

1.57 g. of a commercially obtained 33-percent aqueous solution of highly polymerized ethylenimine having a molecular weight of about 100,000 (corresponding to a chain length of about 2325 $C_2H_4NH$ units) was diluted with 10.9 ml. of water. To the diluted polyethylenimine was added 10.88 g. of a 13.17 percent aqueous solution of sodium starch xanthate having a xanthate D.S. of 0.51. Based on the 1.433 g. weight of the starch xanthate (dry basis), there were present 3.5 stoichiometric equivalents of ethylenimine. After the reactants were thoroughly mixed, they were allowed to stand for 30 minutes at ambient temperature to form a soft gel that was then dissolved after dilution with 150 ml. of water. The starch polyethyleniminothiourethane solution was then stirred into 750 ml. of a 2-percent aqueous suspension of unbleached softwood sulfate pulp having a S-R (Schopper-Riegler) freeness of 800 ml. After adjusting the pH to 6.5 with dilute HCl, the experimental pulp suspension and a control pulp suspension were each diluted to 6000 g. with water (0.25% suspension by weight), the pH readjusted to 6.5, and the resulting furnishes were used in a laboratory model mold to make handsheets. Whereas the entirely cellulosic control sheets weighed 1.2 g., the experimental handsheets containing 10% of the cellulosic weight of the starch thiourethane weighed 1.32 g. Other experimental handsheets were prepared where the starch thiourethane additive based on the dry weight of cellulose was 5% and 1%. After drying the handsheets, they were tested in replicate. The results are shown in Table I.

TABLE I

| | Controls | Starch thiourethane added | | |
|---|---|---|---|---|
| | | 10% | 5% | 1% |
| Burst, lbs./in.² | 47.1 | 55.0 | 51.9 | 53.8 |
| Dry breaking length, meters | 6,690 | 7,760 | 7,590 | 7,400 |
| Wet breaking length, meters | 210 | 410 | 270 | 260 |
| MIT fold | 420 | 560 | 510 | 485 |
| Tear | 193 | 150 | 163 | 170 |
| Basis wt., g./m.² | 62.8 | 61.0 | 58.0 | 59.5 |

By comparison with the lower D.S. products of the other examples, it is seen that the additive having a D.S. of 0.51 gives commercially unacceptable improvements.

Analysis of the experimental handsheets containing 5% of the additive based on the weight of cellulose (100% retention) gave N, 0.25%, and S, 0.41%, as against calculated respective values of 0.26% and 0.35% for the obtained 0.51 D.S. derivative wherein an average of almost precisely one hydroxyl oxygen per two AGU's has been substituted by the group, $[CS(C_2H_4N)_{1.75}H_{0.75}]$, there being one

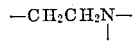

group per C=S for bonding to starch and three noncrosslinked —CH₂CH₂NH— groups for every four xanthate groups.

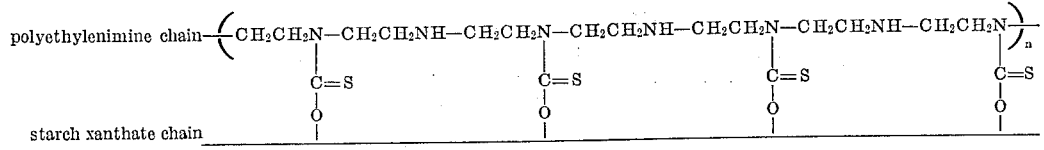

EXAMPLE 2

11.83 g. of an aqueous solution containing 1.455 g. of 0.34 D.S. sodium starch xanthate, dry basis, was mixed into 11.8 ml. of water containing 1.15 g. of the same commercially obtained 33 percent solution of polyethylenimine employed in Example 1, the stoichiometric ratio again being 3.5:1. The soft gel that formed during 3 hours of sitting readily dissolved after dilution with 150 ml. water. Additions thereof corresponding to 10 percent and 2.5 percent based on the dry weight of the cellulose were made to another batch of the faintly acidified 0.25 percent pulp suspension used in Example 1, and the thusly fortified papermakers' furnish was used for the preparation of handsheets as in the preceding example. The properties are set forth in Table II.

TABLE II

| | Control | Starch thiourethane added | |
|---|---|---|---|
| | | 10% | 2.5% |
| Burst, lbs./in.² | 50.0 | 64.2 | 64.2 |
| Dry breaking length, m | 7,510 | 8,790 | 8,855 |
| Wet breaking length, m | 220 | 590 | 675 |
| MIT fold | 450 | 760 | 880 |
| Tear | 202 | 125 | 120 |
| Basis wt., g./m.² | 61.5 | 58.4 | 59.5 |

EXAMPLE 3

12.39 g. of an aqueous solution containing 1.456 g. (dry basis) of sodium starch xanthate having a xanthate D.S. of 0.25 was mixed into 12.4 ml. of water containing 0.894 g. of the same polyethylenimine solution empolyed in the previous examples, the polyethylenimine again being present in a stoichiometric ratio of 3.5:1. The soft gel that formed during the course of one-half hour was dissolved following dilution with about 150 ml. of water. The starch thiourethane solution was added to 0.25% pulp suspension this time adjusted to pH 8.0 in amounts corresponding to 10%, 5%, and 2.5% additions based on the dry weight of cellulose. Handsheets were made as previously described. The starch thiourethane had a thiourethane D.S. of 0.25 and analysis of a handsheet containing a 5% addition of the crosslinked starch product gave N, 0.16%, and S, 0.22%, against calculated values of 0.15% and 0.20%. Table III shows the physical properties of the handsheets.

TABLE III

| | Controls | Starch thiourethane added | | |
|---|---|---|---|---|
| | | 10% | 5% | 2.5% |
| Burst, lbs./in.² | 52.1 | 70.6 | 65.2 | 59.5 |
| Dry breaking length, m | 7,700 | 9,260 | 9,140 | 8,210 |
| Wet breaking length, m | 235 | 860 | 545 | 390 |
| MIT fold | 500 | 790 | 650 | 590 |
| Tear | 179 | 116 | 135 | 161 |
| Basis wt., g./m.² | 61.5 | 59.8 | 58.4 | 58.5 |

EXAMPLE 4

An aqueous solution of sodium starch xanthate having a xanthate D.S. of 0.12 was reacted with 3.5 stoichiometric equivalents of the previously described polyethylenimine to provide a starch thiourethane having a thiourethane D.S. of 0.12. Table IV shows the physical properties of handsheets prepared from pH 6.0 pulps after the additions of the starch thiourethane at levels of 10%, 5%, and 2.5%.

TABLE IV

| | Controls | Starch thiourethane added | | |
|---|---|---|---|---|
| | | 10% | 5% | 2.5% |
| Burst, lbs./in.² | 45.8 | 83.2 | 78.1 | 68.9 |
| Dry breaking length, m | 6,590 | 10,650 | 9,720 | 8,650 |
| Wet breaking length, m | 220 | 1,230 | 990 | 650 |
| MIT fold | 600 | 2,540 | 1,800 | 1,280 |
| Tear | 228 | 110 | 119 | 131 |
| Basis wt., g./m.² | 60.6 | 59.8 | 62.3 | 61.5 |

I claim:
1. A starch polyethyleniminothiourethane product obtained by reacting in an alkaline aqueous medium a sodium starch xanthate having a xanthate D.S. of 0.12 to about 0.34 with a 2.5 fold excess of polyethylenimine having a molecular weight of about 100,000, said excess being above the stoichiometry of one ethylenimine group per xanthate group in said sodium starch xanthate for at least 30 minutes.

2. A process for preparing paper comprising adding to a cellulosic pulp suspension about 2.5–10 percent based on the dry weight of the pulp of an aqueous solution of a product as defined in claim 1, adjusting the pH in order to precipitate said product onto the pulp, forming water-laid paper therefrom, and drying said paper.

3. Paper comprising cellulosic fibers and about 2.5–10 percent based on the dry weight of said fibers of a product as defined in claim 1.

References Cited

UNITED STATES PATENTS 3,291,789  12/1966  Bridgeford _____ 162—175 X
3,331,833   7/1967  Jarowenko _____ 260—233.3
3,335,023   8/1967  Bridgeford _____ 162—175 X S. LEON BASHORE, *Primary Examiner.*

U.S. Cl. X.R.

106—213; 117—156; 260—2, 9, 233.5